United States Patent
Dietrich et al.

(10) Patent No.: US 12,269,768 B2
(45) Date of Patent: Apr. 8, 2025

(54) GLASS-CERAMIC COVER GLASS, PROCESS FOR PRODUCTION THEREOF AND USE THEREOF, AND DIGITAL DISPLAY DEVICE COMPRISING SUCH A COVER GLASS

(71) Applicants: SCHOTT AG, Mainz (DE); SCHOTT Technical Glass Solutions GmbH, Jena (DE)

(72) Inventors: Ruediger Dietrich, Jena (DE); Bernd Ruedinger, Woerrstadt (DE); Meike Schneider, Taunusstein (DE); Jochen Alkemper, Klein-Winternheim (DE); Lars Mueller, Wiesbaden (DE); Thomas Pfeiffer, Ingelheim (DE); Julian Koch, Mainz (DE)

(73) Assignees: SCHOTT AG, Mainz (DE); SCHOTT TECHNICAL GLASS SOLUTIONS GMBH, Jena (DE)

( * ) Notice: Subject to any disclaimer, the term of this patent is extended or adjusted under 35 U.S.C. 154(b) by 191 days.

(21) Appl. No.: 18/064,873

(22) Filed: Dec. 12, 2022

(65) Prior Publication Data

US 2023/0183128 A1    Jun. 15, 2023

(30) Foreign Application Priority Data

Dec. 10, 2021 (DE) .................. 10 2021 132 738.5
Jun. 3, 2022 (DE) .................. 10 2022 114 184.5

(51) Int. Cl.
*C03C 10/00* (2006.01)
*C03B 32/02* (2006.01)
(Continued)

(52) U.S. Cl.
CPC .......... *C03C 10/0027* (2013.01); *C03B 32/02* (2013.01); *C03C 3/083* (2013.01);
(Continued)

(58) Field of Classification Search
CPC ............ C03C 10/0009; C03C 10/0054; C03C 10/0027; C03B 3/083
See application file for complete search history.

(56) References Cited

U.S. PATENT DOCUMENTS 6,673,729 B2 *   1/2004   Siebers ............... C03C 10/0027
                                                        359/359
9,249,045 B2 *   2/2016   Gabel ..................... C03B 32/02
(Continued)

FOREIGN PATENT DOCUMENTS

CN      112441746      3/2021
CN      113754289     12/2021
(Continued)

OTHER PUBLICATIONS

Beall, "Ion-Exchange in Glass-Ceramics", Frontiers in Materials, vol. 3, Aug. 23, 2016, 11 pages.
(Continued)

*Primary Examiner* — Joanna Pleszczynska
(74) *Attorney, Agent, or Firm* — Ruggiero McAllister & McMahon LLC

(57) ABSTRACT

A cover glass is provided that includes a silica based glass ceramic with a thickness between 0.4 mm and 0.85 mm. The glass ceramic has a transmittance of more than 80% from 380 nm to 780 nm and a stress attribute selected from: an overall compressive stress (CS) of at least 250 MPa and at most 1500 MPa, a compressive stress at a depth of 30 μm (CS30) from one of the two faces of at least 160 MPa and at most 525 MPa, a depth of the compression layer (DoCL) of at least 0.2 times the thickness and less than 0.5 times the thickness, and any combinations thereof. The glass ceramic has at least one silica based crystal phase having in a near-surface layer a unit cell volume of at least 1% by volume larger than that of a core where the crystal phase has minimum stresses.

18 Claims, 8 Drawing Sheets

(51) Int. Cl.
  *C03C 3/083* (2006.01)
  *C03C 3/085* (2006.01)
  *C03C 3/087* (2006.01)
  *C03C 21/00* (2006.01)

(52) U.S. Cl.
  CPC .............. *C03C 3/085* (2013.01); *C03C 3/087* (2013.01); *C03C 10/0009* (2013.01); *C03C 10/0054* (2013.01); *C03C 21/002* (2013.01); *C03C 2201/50* (2013.01); *C03C 2203/20* (2013.01); *C03C 2203/50* (2013.01); *C03C 2204/00* (2013.01)

(56) References Cited

U.S. PATENT DOCUMENTS

| | | |
|---|---|---|
| 2007/0259767 A1 | 11/2007 | Siebers |
| 2010/0009154 A1 | 1/2010 | Allan |
| 2016/0102010 A1 | 4/2016 | Beall |
| 2017/0183257 A1* | 6/2017 | Apitz .................. C03C 3/07 |
| 2020/0002225 A1 | 1/2020 | Schneider |
| 2020/0207660 A1 | 7/2020 | Li |
| 2020/0346969 A1 | 11/2020 | Li |
| 2021/0292225 A1 | 9/2021 | Umada |

FOREIGN PATENT DOCUMENTS

| | | |
|---|---|---|
| DE | 102006056088 | 5/2008 |
| DE | 102012104168 | 11/2013 |
| EP | 3838858 | 6/2021 |
| EP | 2819966 | 8/2021 |

OTHER PUBLICATIONS

Din En Iso 11664-4. "Colorimetry—Part 4: CIE 1976 L*a*b* Colour space (ISO 11664-4:2008) English translation of Din En Iso 11664-4:2012-06", Jun. 2012, 12 pages.

Din Iso 6344-2, "Coated abrasives—Grain size analysis Part 2: Determination of grain size distribution of macrogrits P12 to P220", Apr. 2000, 11 pages.

* cited by examiner

GLASS-CERAMIC COVER GLASS, PROCESS FOR PRODUCTION THEREOF AND USE THEREOF, AND DIGITAL DISPLAY DEVICE COMPRISING SUCH A COVER GLASS

CROSS REFERENCE TO RELATED APPLICATIONS

This application claims benefit under 35 USC § 119 of German Application 10 2021 132 738.5 filed Dec. 10, 2021 and German Application 10 2022 114 184.5 filed Jun. 3, 2022, the entire contents of both of which are incorporated herein by reference.

BACKGROUND

1. Field of the Invention

The present invention relates generally to a glass-ceramic cover glass, to a process for production thereof and to the use thereof, and to a digital display device comprising such a cover glass.

2. Description of Related Art

Cover glasses that are used in display devices have already long formed part of the prior art. Such cover glasses are frequently also referred to as covers. In most cases, such cover glasses that are arranged so as to protect the electronic components and display devices disposed behind these glasses, for example in a smartwatch or smartphone, comprise a chemically tempered glass in order to increase mechanical strength of the cover glass compared to the non-tempered state. Additionally also known is the use of glass-ceramic panes, wherein glass ceramics used are preferably those already having greater intrinsic mechanical strength than a non-tempered glass.

Depending on the exact configuration of a glass ceramic, it may also be temperable. There are in principle two conceivable mechanisms here. For instance, the glass ceramic, as well as crystalline constituents, also comprises a vitreous constituent that can also be referred to as "residual glass phase". If a glass ceramic is chemically tempered, it is therefore possible that an ion exchange takes place in the glass phase itself, and in that respect proceeds quite similarly to the manner in a glass without crystalline constituents. But it is also possible and may even be advantageous when the ion exchange in the chemical tempering takes place into a crystal phase encompassed by the glass ceramic.

An overview of different mechanisms in the tempering of glass ceramics is given, for example, by G. H. Beall et al., "Ion-Exchange in Glass-Ceramics", Frontiers in Materials 2016, 3, Article 41.

US patent application US 2020/0346969 A1 describes a crystallized three-dimensionally shaped glass which is chemically tempered. The glass ceramic comprises keatite as crystalline phase. Nucleation is preferably effected purely via $ZrO_2$ as nucleating agent.

US patent application US 2021/0292225 A1 describes a chemically tempered glass plate, a cover glass and an electronic device comprising such a cover glass. The chemically tempered glass may also take the form of partly crystallized glass and may comprise, for example, keatite as crystal phase. Nucleation in this case preferably proceeds via the nucleating agents $ZrO_2$ and $SnO_2$.

Glass ceramics comprising keatite as crystalline phase may already intrinsically have high strength and also have good chemical temperability, but usually have distinct turbidity, such that cover glasses for display devices are possible with such glass ceramics, but are difficult to produce.

There is therefore a need for chemically temperable glass ceramics for use as cover glass for electronic display devices that are producible in good optical quality by a robust production process. There is likewise a need for a corresponding production process for such glass ceramics or for cover glasses comprising such a glass ceramic.

SUMMARY

It is an object of the invention to provide a cover glass comprising a silica based glass ceramic that at least partly alleviates the aforementioned weaknesses of the prior art. Further aspects relate to a process for producing such a cover glass and to the use thereof.

The invention thus relates to a cover glass having a thickness of 0.4 mm to 0.85 mm, comprising a silica based glass ceramic, wherein the cover glass has a transmittance, $\tau_{vis}$, in the range from 380 nm to 780 nm of more than 80%, preferably more than 85%, preferably determined at cover glass thicknesses of 0.4 mm to 0.85 mm, especially preferably determined at a cover glass thickness of 0.7 mm. The cover glass is in chemically tempered form. The cover glass has a CS (compressive stress) of at least 250 MPa and preferably at most 1500 MPa and/or a CS30 (compressive stress at a depth of 30 μm, determined from one of the two lateral faces (or "surfaces") of the cover glass) of at least 160 MPa and preferably at most 525 MPa and/or a DoCL (thickness of the tempered layer—or depth of the compression layer) of at least 0.1 times the thickness of the cover glass and preferably less than half of the thickness of the cover glass. The silica based glass ceramic comprises at least one silica based crystal phase having, in at least one near-surface layer, especially in a layer having a depth of 20 μm to 70 μm, determined at a right angle from one of the lateral faces of the cover glass, preferably averaged by the tempering process, a unit cell volume of at least 1% by volume, preferably at least 2% by volume, larger than that of the crystal phase in the core. The core of the cover glass is understood to mean the microstructure of the cover glass in a layer below 70 μm, determined at a right angle from one of the two lateral faces of the cover glass. In other words, the core of the cover glass may also be understood to mean the "bulk" thereof. In general, tension is at a minimum in the core of the cover glass.

The unit cell volume is determined via thin-layer x-ray diffraction measurements. According to the angle of incidence Ω of the x-ray onto the planar sample surface (e.g., Ω=0.5° to Ω=5°), information depths of about 2 μm to 20 μm are found. Lattice constants and unit cell volume can be calculated via common standard methods from the positions of the x-ray diffraction reflections measured, this calculation providing an average, especially along the beam pathway of the diffracted x-rays. By controlled removal of the surface and subsequent reanalysis, it is thus possible to determine unit cell volumes down to the regions that have not undergone ion exchange. The comparatively small changes in lattice constants as a result of the compressive and tensile stresses in the glass ceramic can be neglected by comparison with the large changes in lattice constants resulting from the ion exchange in the crystal structures.

Transmittance, or $\tau_{vis}$, in the context of the disclosure is understood to mean transmittance between 380 and 780 nm, measured to DIN 5033. This is identical to the Y value according to the CIE color system, measured with standard illuminant C, observer angle 2°, for a 4 mm-thick polished glass ceramic sample. This light corresponds to white light having a color temperature of 6800 K, and hence represents moderate daylight.

One configuration of a cover glass as described above has a number of advantages.

The cover glass comprises a silica based glass ceramic, meaning that it is already a chemically very resistant component. A silica based glass ceramic in the context of the present disclosure is understood to mean a glass ceramic comprising $SiO_2$ and preferably a crystal phase having, as a structural unit, an $SiO_4^{4-}$ tetrahedron, i.e., what is called a crystalline silicate. A silica based glass ceramic inherently already brings good mechanical stability. In addition, the cover glass is chemically tempered, namely having a CS (compressive stress) of at least 250 MPa and preferably at most 1500 MPa and/or a CS30 of at least 160 MPa and preferably at most 525 MPa and/or a DoCL of at least 0.1 times the thickness of the cover glass and preferably less than half the thickness of the cover glass. In this way, advantageous properties of the cover glass are achievable with regard to the mechanical application tests, for example what are called "set drop tests" relating to the behavior of the cover glass in the installed state in a device, such that it is possible to use sufficiently thin and therefore also light cover glasses. The cover glass therefore has a thickness of 0.4 mm to 0.85 mm. This is additionally also advantageous because high transmittances, $\tau_{vis}$, of more than 80%, preferably of more than 85%, are achieved in this way in the wavelength range between 380 nm and 780 nm. For comparative purposes, the transmittance values are preferably determined at a cover glass thickness of 0.7 mm. For comparative purposes as to whether they meet this condition, thinner glasses may be stacked in order to achieve a corresponding thickness; thicker glasses may be thinned. In general, these transmittance values are achieved for cover glass thicknesses between 0.4 mm and 0.85 mm.

The silica based glass ceramic encompassed by the cover glass comprises at least one silica based crystal phase having, in at least one near-surface layer, especially in a thickness between 20 μm and 70 μm, determined at a right angle from one of the lateral faces of the cover glass, preferably averaged by the tempering process, a unit cell volume of at least 1% by volume, preferably at least 2% by volume, larger than that of the crystal phase in the core. In other words, the silica based glass ceramic comprises a crystal phase that takes the form—in the chemically non-tempered state—of a temperable crystal phase, and in the chemically tempered state of the cover glass, in embodiments, is in tempered form such that the volume of the unit cell has increased as described above. The increase in size of the unit cell of the crystal phase in the chemically tempered state here does not extend over the entire thickness of the cover glass, but rather only within a particular region, namely in the near-surface region of the cover glass. The cover glass, configured in the form of a slice in such a way that its thickness is at least one order of magnitude lower than its length and width, therefore has two lateral faces (or "sides"), the dimensions of which are determined by length and width, and from which the near-surface layer is determined at right angles inward toward the core of the cover glass. This near-surface layer is formed on either side of the cover glass. It is preferably in a layer having a depth of 20 μm to 70 μm. The volume of the unit cell of the crystal phase differs here from that of the unit cell of the same crystal phase in the core of the cover glass. The crystal phase having an enlarged unit cell in the near-surface layer compared to the unit cell in the core is preferably a silica based crystal phase.

There is thus an increase in size of the unit cell of the crystal phase at least in the near-surface region. According to the exact tempering protocol, the ion-exchanged region may have a depth of up to 300 μm. It has been found that, depending on the exact depth of the layer in question in the cover glass, there is a different proportion of ion-exchanged crystal phases. In other words, this means that, in embodiments, there is a thickness profile in the cover glass. Thus, at the surface of the cover glass and preferably into the region of a near-surface layer, preferably from 20 μm to 70 μm, there is virtually complete exchange, as can be shown in corresponding EDX profiles, down to a minimum. In the case of long tempering protocols with a tempering time of, for example, 12 hours, ion exchange is detectable down to a depth of about 300 μm. The DoCL here is 145 μm; a compressive stress curve therefore develops in the cover glass according to the capacity of the material to store tensile stress. The inventors assume that ion-exchanged crystals/crystallites/crystal phases present in regions below the DoCL determined by physical measurement technology do not contribute to compressive stress because the proportion thereof in the crystal phases is lower, and so there is thus tempering because the increased volume of the crystal phase in the near-surface region on either side of the cover glass thus generates compressive stress on the inner core of the cover glass.

In other words, tempering is achieved here not via exchange into a vitreous phase, but into a crystalline phase. It has also been found here that, in the case of such chemical tempering with an exchange of ions that takes place in a crystalline phase, very efficient tempering takes place. Surprisingly, this tempering is even better than an ion exchange for a vitreous material that is of the same chemical composition but is not in crystallized form. Although an equal amount of ions is exchanged, the tempering that develops in the cover glass, in embodiments, is better. In other words, the same amount of exchanged ions leads to higher tempering in a cover glass in embodiments comprising a silica based glass ceramic. The tempering process is thus efficient in relation to the tempering developed. This is also apparent by way of example in FIG. 9, in which a tempering profile of a cover glass according to one embodiment is compared with a tempering profile for a cover glass comprising a material that is of the same chemical composition but unceramized. Tempering profile 5 corresponds to that of a cover glass according to one embodiment, tempering profile 6 to that of a cover glass comprising a material of the same chemical composition, but in vitreous and unceramized form.

Thus, given the same level of exchange, i.e., with an essentially equal amount of exchanged ions from the exchange bath, more efficient tempering is achieved. It is thus possible in the case of exchange into the crystalline phase to build up compressive stress more efficiently than in the case of exchange into a vitreous material. At the same time, there are pointers that, in this way, the tempering thus created in a glass ceramic has greater thermal and temporal stability than in the case of a chemically tempered glass of the same composition. For instance, it could be the case that the tempering introduced into the glass ceramic by means of ion exchange into the crystal phase possibly does not relax as quickly as chemical tempering introduced into the vitreous material. It is also found that the storable tempering in the glass-ceramic material is higher than that in a vitreous material of the same chemical composition (in this regard see likewise FIG. 9 of the drawings of the present disclosure).

Die advantageous properties associated with the cover glass of the present disclosure are based upon the fact that for a similar chemical tempering process—for example for the same duration of the tempering—a higher stress is introduced in the cover glass comprising or consisting of glass ceramic than in a cover glass comprising or consisting of a glass with the same chemical composition. That is, in a similar chemical tempering, the maximum achievable tensile stress within the cover glass according to embodiments is higher than within a cover glass comprising or consisting of a glass with the same chemical composition as the corresponding glass ceramic. This refers in each case to the chemical composition of the glass or the glass ceramic prior to chemical tempering.

It has been found that the maximum value of tensile stress stored within a cover glass according to an embodiment, that is, having the same chemical composition as a cover glass comprising or consisting of a glass and that has undergone the same chemical tempering, is larger by a factor of 1.6 than the maximum tensile stress (CT) as in the cover glass comprising or consisting of the corresponding glass.

Values that could be obtained for maximum tensile stress (center tension, CT) for a cover glass according to an embodiment compared to a cover glass comprising a glass of the same chemical composition as the glass ceramic are:

|  | CT [MPa] |
| --- | --- |
| Glass ceramic | 215 |
| Glass (green glass) | 145 |

Both cover glass underwent the identical chemical tempering process. The ratio of CT values of glass ceramic cover glass and glassy cover glass is 1.48.

Generally, this ratio may vary between 1.3 and 1.6, with a preferred upper value of 1.5.

These characteristic differences in the CT values may also, by way of example, be found in the depiction of stress profiles, as shown in FIG. 9.

This particularly good chemical tempering that may be and is achieved in the cover glasses according to the present disclosure is ascribed to the chemical tempering, that is, ion exchange, especially in a crystalline phase. This leads not only to an increase of the crystalline unit cell, which in turn is a particular feature of the advantageous cover glasses according to embodiments. Further, this may, by way of example, also yield very good results in a so-called set-drop test.

In one embodiment of the cover glass, the crystal phase, at least in the near-surface layer, i.e., in other words after the tempering process, has a higher proportion of sodium oxide $Na_2O$ and/or potassium oxide $K_2O$ than in the core. The inventors assume that the content in the crystal phase of sodium oxide $Na_2O$ and/or potassium oxide $K_2O$ in the near-surface region is increased in absolute terms by at least 1 mol %, preferably in absolute terms by at least 2 mol % and especially preferably in absolute terms by up to 7 mol %, compared to the corresponding content of the crystal phase in the core.

A particularly crucial factor here, depending on the embodiment, may be specifically the sodium ion $Na^+$. This is because it is smaller than the potassium ion and can therefore be more easily exchanged and therefore reaches higher exchange depths, for example about 0.1 up to 0.4 times the thickness of the cover glass. Exchange depths of, for example, 70 μm or more are thus possible in a simple manner. Tempering values achieved at the surface of the cover glass are about 600 MPa or less, for example around 500 MPa.

Since the potassium ion, as stated, is larger than the sodium ion, it is more difficult for the potassium ion to diffuse into the cover glass. Although low exchange depths are achieved here, the tempering achieved by means of potassium exchange is also higher than that by means of sodium exchange. In this way, compressive stress values at the surface of the cover glass may be up to 1500 MPa, for example 1100 MPa.

In one embodiment, the glass ceramic of the cover glass comprises more than 50% by volume of crystal phase, preferably more than 70% by volume of crystal phase, and especially preferably not more than 95% by volume of crystal phase. This is therefore a glass ceramic comprising only a small residue of vitreous material (called residual glass phase). It has been found that particularly efficient tempering is achievable in this way. The reason for this has not yet been fully understood, but may possibly be based on the fact that a large volume of the crystal phase present results in better tempering in the glass ceramic of the cover glass. In other words, it could be the case that the more crystals or crystallites are available for ion exchange, the higher the tempering achieved. Thus, it has been found that, as also stated above, exchange into the crystalline phase is very efficient. The inventors suspect that, even in the case of otherwise equal exchange rates, better chemical tempering compared to a vitreous material of the same chemical composition is obtained, since it is higher and also more stable. What is surprising is the good temperability into a crystalline phase or crystal phase even in the case of high crystal phase contents of up to 95% by volume or even more, because it was assumed to date that the exchange mechanism is also via the vitreous phase since ions here should be more mobile than in a crystalline structure with fixed lattice sites. In spite of the high crystallinity of the glass-ceramic material, however, in this embodiment, particularly good and efficient tempering is advantageously possible. It is likewise the case that, in spite of the high crystal phase content, there is still very good transparency of the glass ceramic of the cover glass—and hence of the cover glass itself overall.

The stated crystal phase content is based on the total content of crystals in the glass ceramic, regardless of which exact phases are present. In a preferred embodiment, the glass ceramic comprises keatite or keatite solid solution as the main crystal phase, which generally is understood to mean that more than 50% by volume of the crystal phases with a certain crystal structure, that is, in the case of keatite as main crystal phase a keatitic crystal structure, encompassed by the glass ceramic is present. Preferably, up to 98.5% by volume of the crystal phases encompassed by the glass ceramic, or even 100% by volume, may be present with keatitic crystal structure, i.e., as keatite or keatite solid solution. However, it is also possible that the glass ceramic also comprises secondary phases, for example crystalline nucleating agents.

In a further embodiment, the cover glass is characterized by a color value C* of less than 4, preferably of less than 3. In other words, the cover glass has only a very minor tint, such that viewing through the cover glass onto a display behind it is also enabled without disruptive color distortion.

The color value C* or $C_{ab}^*$ is also referred to as chroma and is calculated from the color values a*, b* as follows:

$$C^* = ((a^*)^2 + (b^*)^2)$$

In yet a further embodiment, the cover glass is characterized by a haze of 0.01% to 1% based on a thickness of the cover glass of 0.7 mm. Haze is understood to mean cloudiness. In other words, the cover glass is only slightly cloudy.

In order to achieve a low chromaticity and/or low cloudiness, it may be advantageous for the $TiO_2$ content of the glass ceramic to be limited. $TiO_2$ is a known component of silica based glass ceramics, for example of what are called lithium aluminum silicate glass ceramics, where it can especially serve for efficient nucleation. However, it has been found that this component, even if it does not itself cause coloring, can contribute to coloring of the resulting glass ceramic as a result of cloudiness. The glass ceramic, according to one embodiment, therefore comprises $TiO_2$, preferably to an extent of not more than 4% by weight of $TiO_2$, more preferably to an extent of not more than 3% by weight.

Advantageously, according to one embodiment, the glass ceramic encompassed by the cover glass takes the form of a lithium aluminum silicate glass ceramic, and the crystal phase takes the form of a keatite solid solution. Lithium aluminum silicate glass ceramics are well known as a material, which offers distinct advantages with regard to the production of the glass ceramic. Formation of the glass ceramic comprising keatite solid solution as the crystalline phase (or crystal phase) is also advantageous because it has been found that not every crystal phase in the system of the lithium aluminum silicate glass ceramics has a temperable configuration. However, specifically keatite or keatite solid solution obviously has a crystal structure which is amenable to ion exchange, specifically one in which lithium is exchanged for sodium, and/or sodium and/or lithium for potassium. However, a disadvantage of known keatite solid solution glass ceramics, specifically those that already have intrinsically high strength, is that these glass ceramics usually have high cloudiness. Surprisingly, however, it has been found that cover glasses comprising keatite solid solution glass ceramics are possible, which simultaneously have low cloudiness, only a low level of color, and additionally also high transmittance. The reason for this has not yet been fully understood on the part of the inventors.

However, it has been found that, specifically for lithium aluminum silicate glass ceramic and a keatite solid solution crystal phase, advantageous properties of the cover glass arise when the keatite solid solutions in the near-surface layer have a unit cell volume of more than 510 Å$^3$, preferably more than 515 Å$^3$. The inventors suspect that a solid solution in such a form has a composition in which the optical properties of the crystal phase and of the residual glass phase are optimized to one another in such a way as to result in small differences in refractive index between these two phases. This reduces cloudiness effects.

In general, without restriction to any specific embodiment, the glass ceramic according to one embodiment may comprise the following components in % by weight based on oxide:
$SiO_2$ 55-75, preferably 62-72
$Al_2O_3$ 18-27, preferably 18-23
$Li_2O$ 2.8-5, preferably 3-5

This is a silica based glass ceramic that has sufficiently good meltability as glass and does not tend to immediate and uncontrolled crystallization. In this general composition range, in particular, known lithium aluminum silicate glass ceramics are producible, which are well known, for example, with regard to melting and ceramization conditions. A lithium content of the glass ceramic is also advantageous because exchange of sodium and/or potassium for lithium is possible in this way.

In a further embodiment, the glass ceramic comprises MgO, with a preferred upper limit at 8% by weight. More preferably, the glass ceramic does not comprise more than 4% by weight of MgO. MgO is a preferred component because it promotes the formation of keatite solid solutions. This means that a certain content of MgO leads to lowering of the ceramization temperature. In the case of excessively high contents of MgO, however, unwanted secondary phases can form, for example spinel and/or magnesium titanate. This then has an adverse effect on the transparency of the resulting glass-ceramic material, especially with regard to the scatter thereof. Therefore, the MgO content in the glass ceramic is advantageously limited within the aforementioned limits.

In one embodiment, the glass ceramic further comprises ZnO, preferably to an extent of not more than 6% by weight, especially preferably not more than 2% by weight. Such a ZnO content may be advantageous because ZnO lowers the viscosity of the glass, such that the green glass of the glass ceramic is more easily meltable. However, ZnO leads to formation of extraneous phases in excessively large contents, for example gahnite, and hence leads to elevated scatter.

Other alkaline earth metal oxides such as CaO, BaO can likewise have a positive effect on melting properties. However, the amount of such RO components (including the oxides of the alkaline earth metals and ZnO) should generally be limited in order to avoid the formation of extraneous phases, as would lead to higher scatter and hence to a reduction in transmittance. In addition, it is especially possible to use the oxides of the heavier alkaline earth metals, such as BaO, SrO, in order to match the refractive index of the residual glass phase to the crystal phase and hence to optimize transmittance.

A particular component of the glass ceramic according to one embodiment is $SnO_2$. $SnO_2$ may act, for example, as refining agent in the melt, and then as nucleating agent in the glass ceramic itself. The glass ceramic of the cover glass according to one embodiment therefore preferably comprises $SnO_2$, preferably to an extent of not more than 2% by weight. Particular preference is given to $SnO_2$ contents of at least 0.05% by weight and preferably at most 1.6% by weight. Higher contents of $SnO_2$ lead to a strong tendency to devitrification and hence worsen the producibility of the glass ceramic.

The $ZrO_2$ and $TiO_2$ components can also act as nucleating agents in the glass ceramics in embodiments. It has been found that nucleation and especially the content of nucleating agents in the glass ceramic and the ratio thereof to one another can be decisive in respect of the formation of an only slightly colored silica based glass ceramic having good transmittance and low cloudiness. The glass ceramic, according to one embodiment, therefore comprises $TiO_2$, preferably to an extent of not more than 4% by weight of $TiO_2$, more preferably to an extent of not more than 3% by weight.

A very efficient nucleating agent in the glass ceramic according to one embodiment is additionally also $ZrO_2$. In one embodiment, the glass ceramic therefore comprises $ZrO_2$, preferably to an extent of not more than 5% by weight, especially preferably to an extent of not more than 4% by weight and more preferably to an extent of at least 1.2% by weight.

The glass ceramic may further comprise $Fe_2O_3$, in an amount of up to 0.1% by weight. $Fe_2O_3$ is usually present in the glass ceramics according to embodiments in the form of unavoidable impurities, but at the same time is also beneficial for nucleation, and so a certain content of $Fe_2O_3$ may also be beneficial. In order to obtain a very color-neutral glass ceramic, however, the content of $Fe_2O_3$ should be limited and is preferably not more than 0.02% by weight. In particular, contents between 0.0001% by weight and 0.1% by weight are possible, preferably between 0.0001% and 0.02% by weight. In other words, in general, the $Fe_2O_3$ content in the glass ceramic of the cover glass according to one embodiment is less than 0.02% by weight.

In one embodiment, the ratio of the critical components $TiO_2$ and $ZrO_2$ is subject to the following relationship:

$$0\% < \Sigma\ (TiO_2 + ZrO_2) < 9.5\%, \text{ preferably } 1.2\% < \Sigma\ (TiO_2 + ZrO_2) < 9.5\%.$$

It has been found that, with such a ratio of the two nucleating components $TiO_2$ and $ZrO_2$ to one another, particularly good values can be achieved with regard to cloudiness and a low color level.

This can generally be achieved even better when the further nucleating component $SnO_2$ is also included in the ratio of the nucleating agents to one another. In a preferred embodiment, it is generally the case that:

$$0 \leq SnO_2/(ZrO_2 + TiO_2) < 0.8, \text{ preferably } 0.01 \leq SnO_2/(ZrO_2 + TiO_2) < 0.7.$$

In particular, the glass ceramic according to one embodiment may comprise the following components in % by weight based on oxide:
$SiO_2$ 55-75, preferably 62-72
$Al_2O_3$ 18-27
$Li_2O$ 2.8-5, preferably 3-5
$Na_2O$ 0-4, preferably 0-2
$K_2O$ 0-4, preferably 0-2
MgO 0-8, preferably 0-4
CaO 0-4, preferably 0-2
SrO 0-4, preferably 0-2
BaO 0-4, preferably 0-2
ZnO 0-6, preferably 0-2
$TiO_2$ 0-4, preferably 0-3
$ZrO_2$ 0-5, preferably 1.2-4
$B_2O_3$ 0-2, preferably 0-0.1
$Fe_2O_3$ 0.0001-0.1, preferably 0.0001-0.02
$SnO_2$ 0-2, preferably 0.05-1.6
where the following condition is preferably applicable to the sum total of the $TiO_2$ and $ZrO_2$ components:

$$0\% < \Sigma\ (TiO_2 + ZrO_2) < 9.5\%, \text{ preferably } 1.2\% < \Sigma\ (TiO_2 + ZrO_2) < 9.5\%.$$

In one embodiment, the glass ceramic of the cover glass comprises crystal phases having a crystallite size of 120 nm or less. The crystallites encompassed by the glass ceramic are preferably at most 90 nm or smaller.

Particular preference is given to an embodiment in which the glass ceramic of the cover glass is free of $As_2O_3$ and/or $Sb_2O_3$. What is meant by "free of" these components in the context of the present disclosure is that these components are present solely in the form of unavoidable impurities or traces, in a content of not more than 500 ppm each, based on weight, preferably not more than 100 ppm, based on weight.

In a further embodiment, the cover glass is characterized by a sharp impact strength, determined in a set drop test, of between at least 120 cm and up to 200 cm of drop height.

What is meant by a "sharp impact" strength in the context of the present disclosure is that a smartphone dummy containing the glass to be tested falls by means of a drop device onto a rough surface such that a multitude of small pointed articles (e.g., grains of sand on asphalt, concrete or sandpaper) can penetrate into the glass to be tested. In other words, what this involves is the effect of one or more pointed articles, i.e., for example, particles having very small radii of curvature or where the angle of a proportion of the peaks is less than 100°.

Glass-ceramic cover glasses of the keatite type having chemical tempering of the crystalline phase achieve average drop heights here of about 165 cm, i.e., twice as high as the same type of glass that has not been ceramized and where the chemical tempering has traditionally been built up in the glass phase and which has an average drop height of 77 cm. If the same type of glass is ceramized in a disadvantageous manner (β-quartz solid solution type), such that chemical tempering is not sufficient either in the crystal phase or in the glass phase, drop height is inadequate at 20 cm.

The present disclosure also relates to a process. The process for producing a cover glass, especially a cover glass according to one embodiment, comprises the steps of: producing a silica based green glass by a melting process, followed by hot shaping, thermal treatment of the silica based green glass, wherein at least one nucleation step is conducted within the temperature range of 690° C.-850° C. for a duration of 5 minutes to 8 hours, preferably 30 minutes to 2 hours, and at least one ceramization step within the temperature range of 780° C.-1100° C. for a duration of 3 minutes to 60 hours, preferably 3 minutes to 8 hours, performing at least one ion exchange in an exchange bath having a composition of 100% by weight to 0% by weight of $KNO_3$ and 0% by weight to 100% by weight of $NaNO_3$ and 0% by weight-5% by weight of $LiNO_3$ at exchange bath temperature between 370° C. and 500° C. and for a duration between 2 hours and 50 hours.

In general, it is possible to conduct one or more further exchange steps, for example in a further step with an exchange bath having a composition between 90% by weight of $KNO_3$ and 10% by weight of $NaNO_3$ up to 100% by weight of $KNO_3$ or between 95% by weight of $NaNO_3$ and 5% by weight of $LiNO_3$ up to 99% by weight of $NaNO_3$ and 1% by weight of $LiNO_3$ at temperatures between 370° C. and 500° C. and for a duration between one hour and up to 10 hours.

The measurement of the characteristics of the chemical tempering, CS 0 (compressive stress at the surface of the cover glass), CS 30 (compressive stress or generally stress at a depth of 30 μm) and DoCL (depth of compressive stress layer, sometimes also called exchange depth), can be determined by means of suitable measuring devices, for example the SLP-1000 and the FSM 6000 measuring device. However, DoCL is not identical to ion exchange depth.

The present disclosure therefore also relates generally to a cover glass produced or producible in a process according to one embodiment.

The present disclosure further relates to the use of a cover glass according to one embodiment and/or produced in a process according to one embodiment in electronic devices, especially in electronic display devices, especially in mobile electronic display devices, for example in mobile touch panels and/or mobile digital display devices such as smartphones or smartwatches and generally touch panels. The present disclosure additionally also relates to a display device, especially a digital display device, such as a touch panel or a smartwatch or a smartphone comprising a cover glass according to embodiments and/or produced in a process according to embodiments.

An exchange bath is understood to mean a salt melt, this salt melt being used in an ion exchange process for a glass or glass article. In the context of the present disclosure, the terms "exchange bath" and "ion exchange bath" are used synonymously.

In general, salts in technical grade purity are used for exchange baths. This means that, in spite of the use of, for example, solely sodium nitrate as starting material for an exchange bath, certain impurities are also included in the exchange bath. The exchange bath here is a melt of a salt, i.e., for example, of sodium nitrate, or of a mixture of salts, for example of a mixture of a sodium salt and a potassium salt. The composition of the exchange bath is specified here such that it relates to the nominal composition of the exchange bath without taking account of any impurities present. If, therefore, reference is made to a 100% sodium nitrate melt in the context of the present disclosure, what this means is that the raw material used was solely sodium nitrate. However, the actual sodium nitrate content of the exchange bath may differ therefrom and generally will, since technical grade raw materials in particular have a certain proportion of impurities. However, this is generally less than 5% by weight, based on the total weight of the exchange bath, especially less than 1% by weight.

In a corresponding manner, in exchange baths comprising a mixture of different salts, the nominal contents of these salts are reported without taking account of impurities in the starting materials for technical reasons. An exchange bath with 90% by weight of $KNO_3$ and 10% by weight of $NaNO_3$ may thus likewise still include a minor level of impurities, but these are caused by the raw materials and should generally be less than 5% by weight, based on the total weight of the exchange bath, especially less than 1% by weight.

In addition, the composition of the exchange bath will also vary in the course of ion exchange, since the progressive ion exchange will result in migration of lithium ions in particular from the glass or glass article into the exchange bath. However, such a change in the composition of the exchange bath through aging is likewise not taken into account in the present context, unless explicitly stated otherwise. Instead, the context of the present disclosure is based on the nominal original composition in the specification of the composition of an exchange bath.

DETAILED DESCRIPTION

Figure 1:
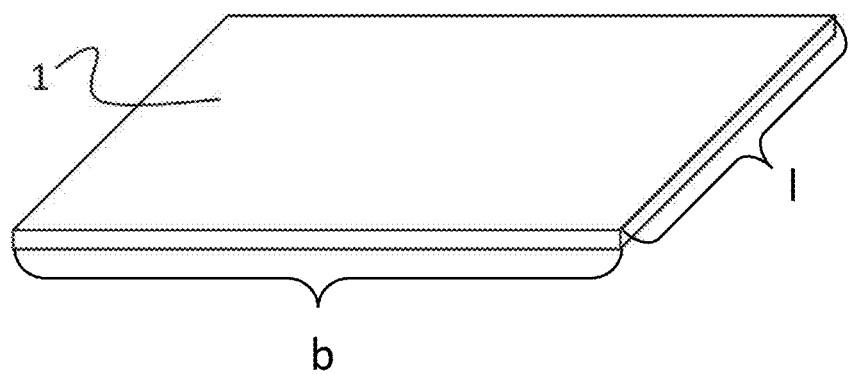
FIG. 1 shows a schematic diagram (not to scale) of a cover glass according to embodiments of the present disclosure.

The invention is elucidated in detail hereinafter by examples.

The compositions of inventive glass-ceramic materials can be found in TABLE 1.

The materials listed in TABLE 1 were melted and refined using raw materials customary in the glass industry at temperatures of about 1600 to 1680° C. The batch was first melted here in sintered silica glass crucibles and was then decanted into Pt/Rh crucibles with inner silica glass crucibles and homogenized by stirring at temperatures of about 1550° C. for 30 minutes. After being left to stand at 1640° C. for 2 h, castings of about 140 mm×100 mm×30 mm in size were made and annealed in a cooling oven at about 620 to 680° C. and cooled down to room temperature. The castings were used to prepare the test specimens for the measurement of the properties in the vitreous state and for the ceramizations.

For the ceramizations, in general, two-stage programs were used, which are specified in TABLE 1. In these, the starting glasses are heated from room temperature firstly to a nucleation temperature above $T_g$, and kept at that temperature for a period sufficient for nucleation. Subsequently, the samples are heated to the ceramization temperature and likewise kept at that temperature. It is also possible to use three- or multistage programs (Example 2 in TABLE 1). Hold times may also be replaced by slow heating rates.

The ceramized samples were used to determine, with the aid of XRD, crystal phases and the contents thereof and transmittance in the visible region $\tau_{vis}$ (on samples having thickness 0.7 mm) and color values in the Lab system (standard illuminant C).

The crystal phase contents reported in TABLE 1 were determined with the aid of x-ray diffraction measurements using a Panalytical X'Pert Pro diffractometer (Almelo, the Netherlands). The x-radiation used was CuKα radiation generated by means of an Ni filter (λ=1.5060 Å). The standard x-ray diffraction measurements on powder samples and solid-state samples were conducted using Bragg-Brentano geometry (θ-2θ). The x-ray diffraction diagrams were measured between 10° and 100° (2θ angle). The relative crystalline phase fractions were quantified, and the crystallite sizes determined, via a Rietveld analysis. Measurement was effected on ground sample material, as a result of which the volume fraction of the core region is distinctly dominant. The measured phase fractions therefore correspond to the phase distribution in the core of the glass ceramic. The "V" samples correspond to comparative examples. The examples that have merely been numbered are examples of embodiments.

TABLE 1

| Examples | V1 | V2 | 1 | 2 | 3 |
| --- | --- | --- | --- | --- | --- |
| $Al_2O_3$ | 19.95 | 19.95 | 22.50 | 19.86 | 21.70 |
| $AS_2O_3$ | 0.85 | 0.85 | | | |
| $B_2O_3$ | | | 0.20 | | |

TABLE 1-continued

|  |  |  |  |  |  |
|---|---|---|---|---|---|
| BaO | 0.84 | 0.84 |  | 2.26 | 0.55 |
| CaO |  |  | 0.02 | 0.43 | 0.25 |
| Cl |  |  |  |  |  |
| Fe$_2$O$_3$ |  |  |  | 0.012 | 0.015 |
| HfO$_2$ |  |  |  |  |  |
| K$_2$O | 0.19 | 0.19 | 0.20 | 0.27 | 0.32 |
| Li$_2$O | 3.67 | 3.67 | 4.40 | 3.95 | 3.64 |
| MgO | 1.07 | 1.07 | 1.02 | 0.27 | 0.32 |
| Na$_2$O | 0.15 | 0.15 | 0.65 | 0.61 | 0.15 |
| Nd$_2$O$_3$ | 0.06 | 0.06 | 0.24 |  | 0.05 |
| P$_2$O$_5$ |  |  | 0.20 |  | 0.03 |
| Sb$_2$O$_3$ |  |  |  |  |  |
| SiO$_2$ | 67.31 | 67.31 | 65.50 | 66.64 | 66.40 |
| SnO$_2$ |  |  | 0.54 | 0.12 | 0.07 |
| SrO |  |  |  |  | 0.50 |
| TiO$_2$ | 2.29 | 2.29 | 1.60 | 2.20 | 2.20 |
| V$_2$O$_5$ |  |  |  |  |  |
| ZnO | 1.70 | 1.70 | 0.44 | 1.50 | 1.94 |
| ZrO$_2$ | 1.76 | 1.76 | 1.95 | 1.90 | 1.85 |
| NaCl |  |  | 0.12 |  |  |
| TOTAL | 99.84 | 99.84 | 99.58 | 100.02 | 99.99 |
| SnO$_2$/(TiO$_2$ + ZrO$_2$) | 0.00 | 0.00 | 0.15 | 0.03 | 0.02 |
| Density [g/cm$^3$] |  | 2.512 |  |  |  |
| Ceramization | 760° C./30 min. + 900° C./10 min. | 760° C./30 min. + 990° C./5 min. | 760° C./60 min. + 990° C./8 min. | 795° C./60 min. + 930° C./60 min. + 975° C./5 min. | 760° C./60 min. + 1000° C./12 min |
| Main crystal phases | HQMK | KMK | KMK | KMK | KMK + HQMK |
| Relative proportion of KMK | n.d. | n.d. | 96 | 96 | 86 |
| $\tau_{vis}$ (C/2) 0.7 mm | 90.3 | 76.6 | 80.2 | 87.6 | 84.9 |
| YI (std. ill. C yellow) | 1.7 |  |  |  |  |
| L* | 96.13 | 90.1 | 91.8 | 95 | 94.1 |
| a* | −0.14 | −0.1 | −1.2 | −0.1 | 1.2 |
| b* | 0.77 | 8.6 | 9.1 | 1.5 | 4.4 |
| C* | 0.78 | 8.6 | 9.2 | 1.5 | 4.6 |

| Examples | V3 | V4 | 4 | 5 | 6 |
|---|---|---|---|---|---|
| Al$_2$O$_3$ | 20.50 | 21.98 | 22.02 | 19.35 | 19.35 |
| As$_2$O$_3$ |  |  |  |  |  |
| BaO | 1.92 |  | 1.23 |  |  |
| CaO |  | 0.02 | 0.02 | 0.03 | 0.20 |
| Fe$_2$O$_3$ | 0.014 | 0.008 | 0.008 | 0.018 | 0.010 |
| HfO$_2$ |  |  |  |  |  |
| K$_2$O |  |  |  |  | 0.50 |
| Li$_2$O | 3.20 | 3.59 | 3.68 | 4.25 | 4.50 |
| MgO | 0.10 | 0.75 | 1.20 | 1.26 | 0.50 |
| Na$_2$O | 0.52 | 0.38 | 0.39 | 0.06 | 0.50 |
| P$_2$O$_5$ |  | 1.37 | 1.36 |  |  |
| SiO$_2$ | 67.40 | 67.70 | 65.90 | 70.90 | 68.50 |
| SnO$_2$ | 0.07 | 1.22 | 1.24 | 1.59 | 1.50 |
| SrO |  |  | 0.01 |  | 0.50 |
| TiO$_2$ | 2.31 | 0.01 | 0.01 | 0.02 |  |
| ZnO | 1.42 |  |  |  | 1.50 |
| ZrO$_2$ | 1.80 | 2.92 | 2.93 | 2.44 | 2.50 |
| TOTAL | 99.25 | 99.94 | 100.00 | 99.92 | 100.06 |
| SnO$_2$/(TiO$_2$ + ZrO$_2$) | 0.02 | 0.42 | 0.42 | 0.65 | 0.60 |
| T$_g$ | 701 |  | 725 |  | 700° C. |
| Ceramization | 760° C./60 min. + 1000° C./12 min | 760° C./60 min. + 1000° C./12 min | 760° C./60 min. + 980° C./8 min | 760° C./60 min. + 990° C./12 min. | 740° C./3 h + 830° C./10 min |
| Main crystal phases | HQMK | HQMK | KMK | KMK | KMK |
| Relative proportion of KMK | — | — | 97.4 | 94.5 | 98.2 |
| KMK crystallite size (nm) | n.d. | n.d. | 68 | 69 | 69 |
| Transmittance D = 0.8 mm | n.d. | n.d. | n.d. | n.d. | n.d. |
| $\tau_{vis}$ (C/2) 0.7 mm YI (std. ill. C yellow) Standard illuminant C | 88.9 | 83.4 | 80.6 | 90 | 82.5/4 mm |

TABLE 1-continued

| | | | | | |
|---|---|---|---|---|---|
| L* | 95.5 | 93.2 | 91.9 | 96 | 92.8 |
| a* | −0.3 | −0.1 | 0.4 | −0.1 | −0.7 |
| b* | 2.4 | 5.6 | 3.2 | 1.2 | 6.1 |
| C* | 2.4 | 5.6 | 3.2 | 1.2 | 6.2 |

| Examples | 7 | 8 | 9 |
|---|---|---|---|
| $Al_2O_3$ | 19.35 | 26.20 | 30.71 |
| $As_2O_3$ | | | 0.50 |
| BaO | | | |
| CaO | 0.20 | 2.44 | |
| $Fe_2O_3$ | 0.010 | | |
| $HfO_2$ | | 0.10 | |
| $K_2O$ | 0.50 | | 6.13 |
| $Li_2O$ | 4.50 | 4.32 | |
| MgO | 0.50 | 0.25 | |
| $Na_2O$ | 0.50 | 0.51 | 12.36 |
| $P_2O_5$ | | | |
| $SiO_2$ | 68.50 | 59.20 | 41.25 |
| $SnO_2$ | 1.50 | 0.47 | |
| SrO | 0.50 | | |
| $TiO_2$ | | | 7.37 |
| ZnO | 1.50 | 1.81 | |
| $ZrO_2$ | 2.50 | 4.16 | 1.67 |
| TOTAL | 100.06 | 99.46 | 100.00 |
| $SnO_2/(TiO_2 + ZrO_2)$ | 0.60 | 0.11 | 0.00 |
| $T_g$ | 700° C. | | |
| Ceramization | 740° C./3 h + 850° C./30 min | 760° C./60 min. + 980° C./8 min. | 850° C./4 h + 900° C./30 min. |
| Main crystal phases | KMK | KMK | Nepheline, rutile (tr) |
| Relative proportion of KMK | 98.3 | 96.5 | — |
| KMK crystallite size (nm) | 72 | 81 | Nepheline = 62 nm |
| Transmittance D = 0.8 mm | n.d. | | |
| $\tau_{vis}$ (C/2) 0.7 mm | 90.2 | 82.8 | 82.2 |
| YI (std. ill. C yellow) Standard illuminant C | | | |
| L* | 96.1 | 92.9 | 92.7 |
| a* | −0.2 | 0.1 | −1.3 |
| b* | 1.2 | 2.9 | 8.5 |
| C* | 1.2 | 2.9 | 8.6 |

For tempering tests, ceramized glass-ceramic panes having a thickness of 0.7 mm were tempered in various salt baths. TABLE 2 shows the change in the crystallographic data on tempering of a glass ceramic of the invention.

TABLE 2

| | a (Å) | C (Å) | V (Å³) | ΔV |
|---|---|---|---|---|
| Literature value for $Li_{0.75}Al_{0.75}Si_{2.25}O_6$ | 7.505 | 9.070 | 510.91 | |
| Non-tempered | 7.499 | 9.099 | 511.64 | 0 |
| 100% $KNO_3$ | 7.501 | 9.199 | 517.56 | 1.16% |
| | 7.443 | 9.687 | 536.59 | 4.88% |
| 80% $KNO_3$ + 20% $NaNO_3$ + 100% $KNO_3$ | 7.499 | 9.261 | 520.76 | 1.78% |
| 99% $KNO_3$ + 1% $NaNO_3$ | 7.497 | 9.275 | 521.35 | 1.90% |
| 95% $KNO_3$ + 5% $NaNO_3$ | 7.502 | 9.295 | 523.09 | 2.24% |
| 90% $KNO_3$ + 10% $NaNO_3$ | 7.503 | 9.303 | 523.77 | 2.37% |

(Literature value ICDD-PDF# 00-035-0794)

The sample after ceramization contains keatite solid solutions as the main crystal phase (96% keatite solid solution, 3% $ZrTiO_4$). After tempering (at temperatures of 420-440° C. for 7.5-18 h), all samples, irrespective of the salt bath selected, had an increase in the size of the unit cell in the near-surface layer of more than 1% compared to the non-tempered sample. The sample that was tempered in 100% $KNO_3$, in the near-surface layer, even showed the formation of two different keatite solid solution structures, both of which had a greater unit cell volume compared to the non-tempered keatite. All samples additionally showed an increase in strength with DoCL values of 102 μm (100% $KNO_3$)-154 μm (80% $KNO_3$/20% $NaNO_3$). The CS 30 values were between 195 MPa and 360 MPa.

Samples with a composition according to example 9 were produced in an analogous manner, ceramized as specified in TABLE 1, ex. 9, and tempered. They contain nepheline ((Na,K)[$AlSiO_4$]) as the main crystal phase and traces of rutile. An XRD measurement for the nepheline (hexagonal structure) gave the following crystallographic data: a=10.026 (5) Å, c=8.372(5) Å, unit cell volume: V=728.8 (10) Å³. The tempering (100% $KNO_3$, 8 h at 500° C.) gave rise to kalsilite (potassium-substituted end member of the nepheline solid solution series, $KAlSiO_4$): a=5.170(5) Å, c=8.730(5) Å. For direct comparison, it is necessary here on account of the different unit cell size of the two structures to double the a lattice constant (for there to be the same number of formula units in the unit cell). For the kalsilite, this results in a unit cell volume of V=808.3(10) Å³, corresponding to an increase in size of about 10%.

Tempering conditions and tempering parameters thus achieved are listed for different cover glasses in the table below.

| Sample | Ion exchange Step 1 | Step 2 | measured with | CS 0 [MPa] | CS 30 [MPa] | DoCL [μm] | CT [MPa] |
|---|---|---|---|---|---|---|---|
| V5 | 7.5 h 420° C. 80/20% K/Na | 4 h 405° C. 100% K | SLP 1000 FSM 6000 | 842 | 179 | 150 | 110 |
| V6 | 10 h 400° C. 80/20% K/Na | | SLP 1000 | 294 | 225 | 143 | 148 |
| 10 | 7.5 h 440° C. 100% Na | | SLP 1000 | 552 | 363 | 112 | 147 |
| 11 | 7.5 h 440° C. 99.5/0.5% K/Na | | SLP 1000 | 341 | 219 | 108 | 81 |
| 12 | 7.5 h 440° C. 100% Na | | SLP 1000 | 506 | 300 | 107 | 149 |
| 13 | 7.5 h 420° C. 80/20% K/Na | 4 h 405° C. 100% K | SLP 1000 | 360 | 252 | 121 | 119 |
| 14 | 12 h 440° C. 80/20 K/Na | | SLP 1000 | 438 | 335 | 145 | 217 |
| 15 | 7.5 h 490° C. 100% K | | SLP 1000 FSM 6000 | 987 | 27 | 28.1/34 | 35 |
| 16 | 7.5 h 440° C. 100% K | | FSM 6000 | 1088 | nd | 11 | 29 |
| 17 | 7.5 h 440° C. 99/1% Na/Li | | SLP 1000 | 341 | 240 | 121 | 118 |

CT stands here for center tension and is reported in MPa.

FIG. 1 shows the schematic diagram (not to scale) of a cover glass 1 according to embodiments of the present disclosure. The cover glass 1 in the present case is in the form of a pane or sheet in that its thickness d (not identified in FIG. 1) is at least one order of magnitude less than the length l and width b of the cover glass 1. The cover glass 1 may, as shown by way of example in FIG. 1, be flat or planar or in the form of a curved or bent pane. Other conceivable embodiments are those in which the cover glass has merely slight curvature in the edge region. The two dimensions of length and width determine the two main areas or sides (in some cases also called "surfaces") of the cover glass 1.

Figure 2:
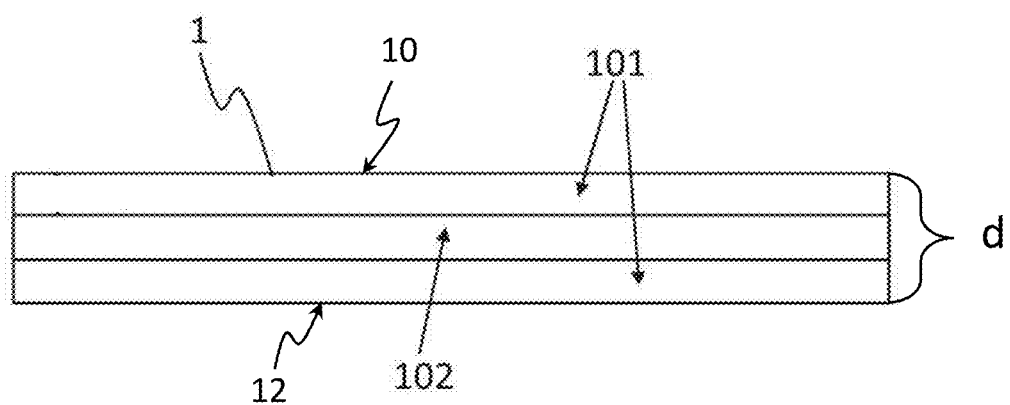
FIG. 2 shows a schematic section diagram (not to scale) of a cover glass according to embodiments of this disclosure.

FIG. 2 shows a schematic section diagram (not to scale) of a cover glass 1 according to embodiments of this disclosure. The cover glass 1 has two sides 10, 12 (these sides may also be referred to as "surfaces" or "main surfaces" of the cover glass 1), with side 10 designed here as top side and side 12 as bottom side. In addition, the thickness d of the cover glass 1 is identified. The cover glass 1 has a layer 101 disposed between the two sides 10, 12, which is also referred to as "near-surface layer" in the context of the present disclosure. The near-surface layer 101 is formed on either side of the cover glass 1 and may be the same, i.e., for example, have an equal thickness within the scope of measurement accuracy. It may alternatively be possible and even preferable for the thickness of the near-surface layer 101 facing one of the two sides, for example side 10, to have a different thickness than the near-surface layer facing side 12. This may be the case, for example, when the chemical tempering of the cover glass 1 has been executed such that exchange is unequal.

The core 102 lies between the two near-surface layers 101. There may be a further adjoining region between the near-surface layer 101 and the core 102, although not identified in FIG. 2, in which there has been ion exchange, but without contributing anything to compressive stress, for example. The core is generally the region of minimum stress in the cover glass 1. The near-surface layers 101, by comparison, have higher stress; they may especially be under compressive stress. The cover glass 1 generally comprises a silica based glass ceramic, with the cover glass 1 generally having a thickness d between 0.4 mm and 0.85 mm. The transmittance, $\tau_{vis}$, of the cover glass 1 is more than 80%, preferably more than 85%, in the range from 380 nm to 780 nm, preferably determined for thicknesses between 0.4 mm and 0.85 mm, especially preferably at a thickness of 0.7 mm. The cover glass 1, as a result of a chemical tempering, the effect of which is that, at least in a near-surface layer 101 or in the two near-surface layers 101, especially in a layer of 20 μm to 70 μm, determined at a right angle from one of the lateral faces 10, 12 of the cover glass 1, a crystal phase encompassed by the cover glass 1 or by the glass ceramic that encompasses it, preferably averaged by the tempering process, has a unit cell volume that is at least 1% by volume, preferably at least 2% by volume, greater than that of the crystal phase in the core 102. The crystal phase encompassed by the glass ceramic of the cover glass 1 may preferably be a silica based crystal phase. As a result of the chemical tempering, the cover glass 1 has a CS of at least 250 MPa and preferably at most 1500 MPa and/or a CS30 of at least 160 MPa and preferably at most 525 MPa and/or a DoCL, based on the cover glass 1, of at least 0.2 times the thickness d of the cover glass 1 and preferably less than 0.5 times the thickness d of the cover glass 1.

FIGS. 3 to 6 relate to the performance of what is called the set drop test for determination of set drop resistance.

Figure 3:
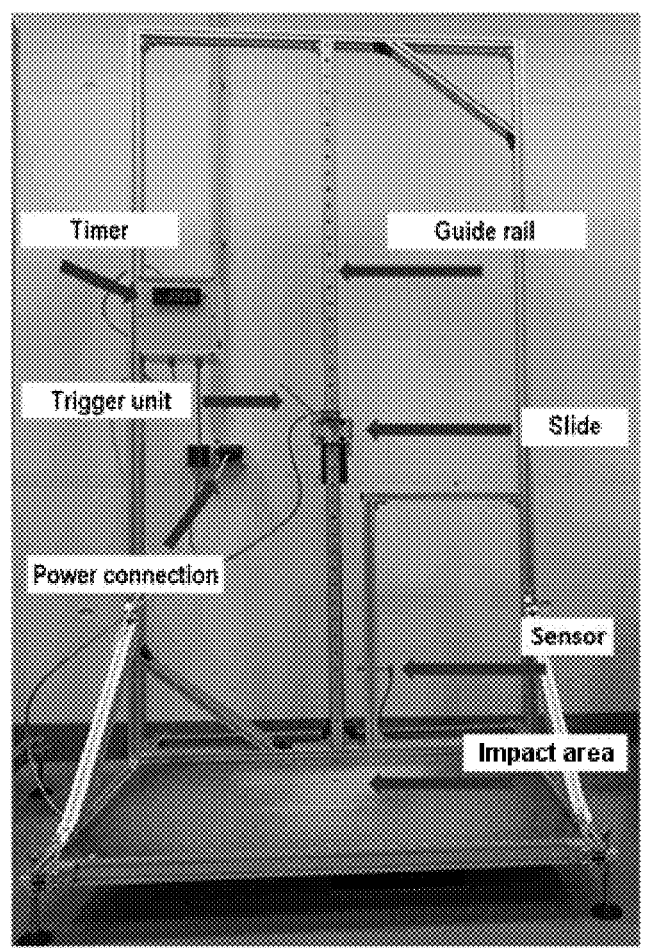
FIG. 3 shows an overall structure of a test apparatus for a drop test.
Figure 4:
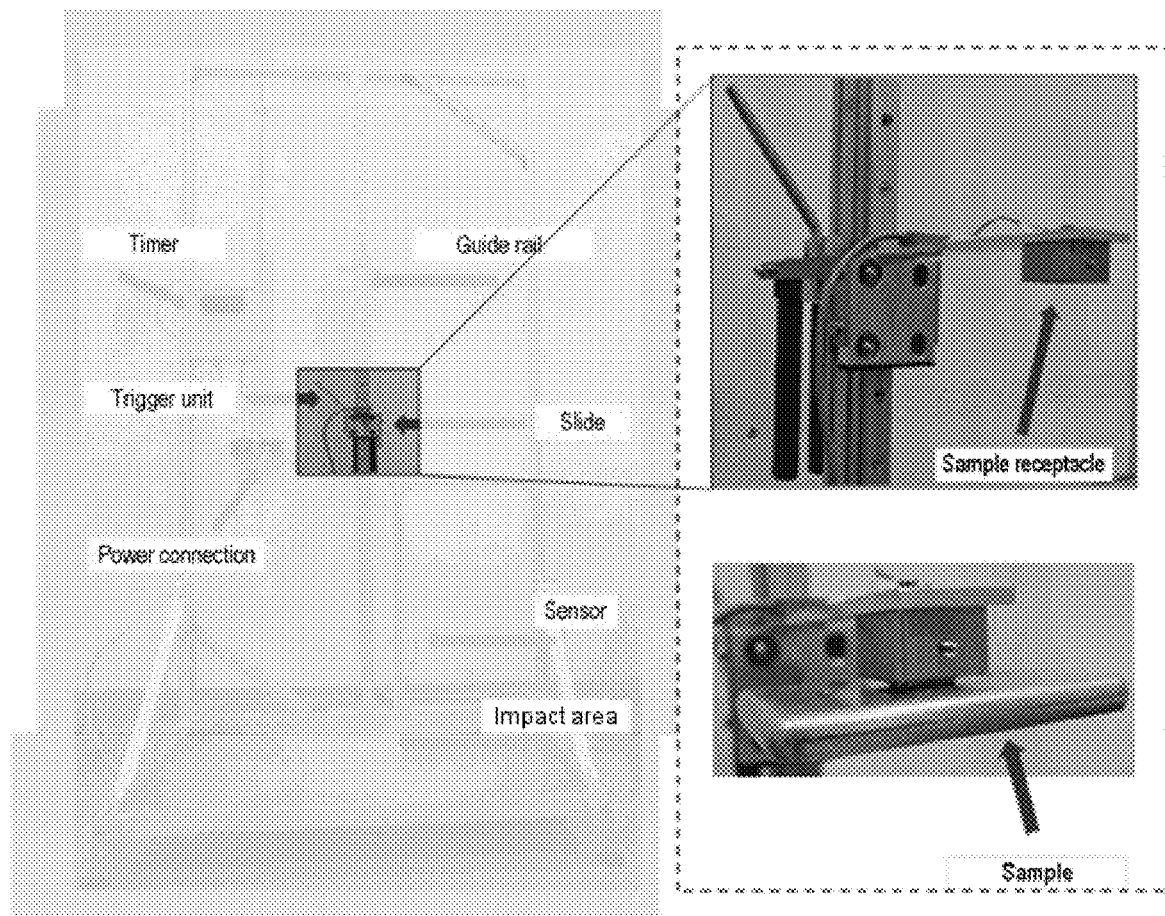
FIG. 4 shows a sample receptacle of the test apparatus of FIG. 3.
Figure 5:
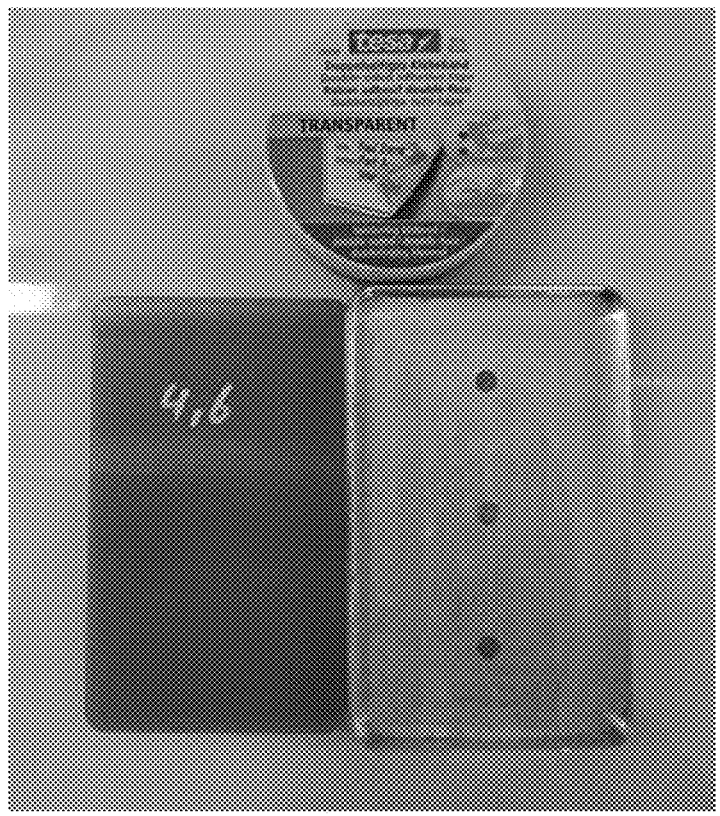
FIG. 5 shows a cover glass of the test apparatus of FIG. 3.
Figure 6:
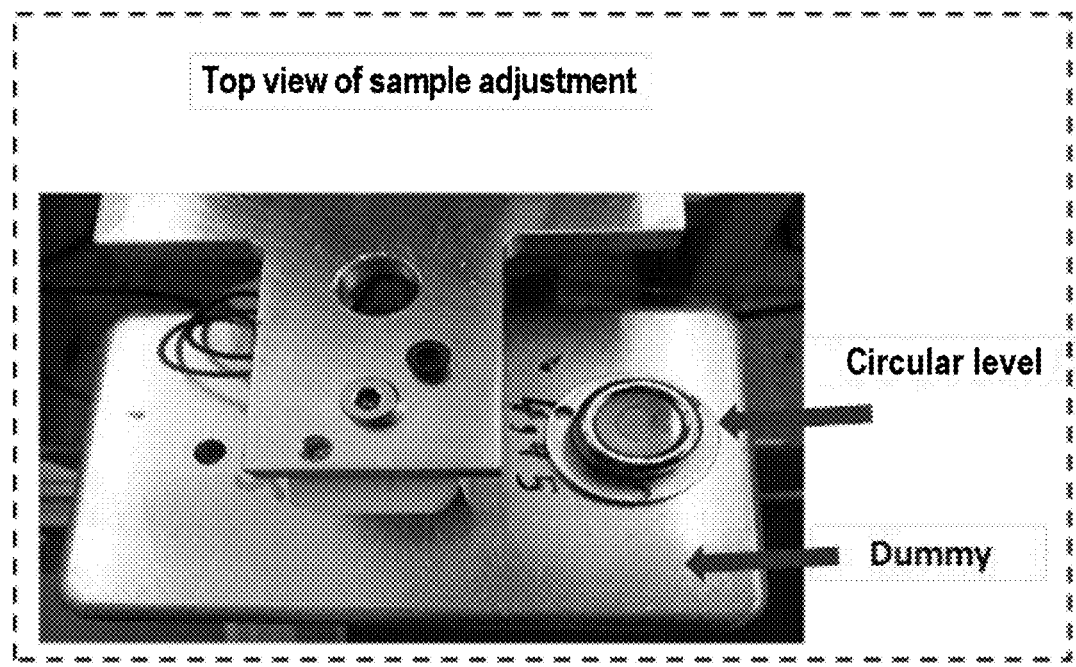
FIG. 6 shows the sample in the test apparatus of FIG. 3.

The set drop test is preferably conducted as follows:

A cover glass is fixed on a sample receptacle and allowed to fall from accumulating drop heights onto a defined floor. An overview of the overall structure is shown in FIG. 3. The cover glass used in the set drop test in FIG. 5 has a length of 99 mm and a width of 59 mm, and, as shown in FIG. 4, is fixed magnetically with a sample dummy in the sample receptacle. For the studies outlined in the present disclosure, in a departure from the sample representation in FIG. 4, however, cover glass formats of 49.5 mm×49.5 mm were used, without affecting the basic construction of the test procedure in FIGS. 3 to 6.

First of all, a plastic sheet is stuck with the aid of a double-sided adhesive tape into a metal housing having the shape and weight of a holder for an ultimate mobile device, for example a smartphone. Suitable plastic sheets here are for example those having thicknesses between 4.35 mm and 4.6 mm (see FIG. 5). They are preferably stuck in by means of a double-sided adhesive tape having a thickness of about 100 μm. Then, by means of a double-sided adhesive tape, preferably a double-sided adhesive tape of thickness 295 μm, especially a double-sided adhesive tape of the tesa® brand, product number 05338, the glass article to be tested and in the form of a pane is stuck onto the plastic sheet in such a way that a distance between 350 μm and 450 μm is obtained between the top edge of the housing/holder and the top edge of the glass article. The cover glass lies higher than the housing frame, and there must be no occurrence of direct contact between cover glass and aluminum housing. The set thus obtained with a weight of 177.5 g, which simulates the incorporation of a cover glass into an ultimate mobile device and is a kind of dummy for a real ultimate mobile device, a smartphone here in particular, is subsequently allowed to drop downward onto an area of DIN A4 size, called the impact area, by the glass side with an initial speed in vertical direction, and hence a fall direction of zero. The impact area is produced here as follows: Sandpaper with an appropriate grain size, for example grain size 60 (#60), is stuck onto a base plate by means of a double-sided adhesive tape, for example an adhesive tape of thickness 100 μm. The adhesive tape used was Tesa (10 m/15 mm), transparent, double-sided, product number 05338. Grain size in the context of the present disclosure is defined according to the standards of the Federation of European Producers of Abrasives (FEPA); for examples thereof see also DIN ISO 6344, especially DIN ISO 6344-2:2000-04, Coated abrasives—Grain size analysis—Part 2: Determination of grain size distribution of macrogrits P 12 to P 220 (ISO 6344-2:1998). The weight of the base plate, which, with the values disclosed in the present context, is an aluminum base, is about 3 kg.

The base plate must be firm and is preferably formed from aluminum or else alternatively from steel. The sandpaper must be completely covered with adhesive tape and stuck down without bubbles. The impact area must be used only for five drop tests and should be exchanged after the fifth drop test. The sample, i.e., the set obtained, is inserted into the test apparatus and aligned by means of a 2D water level (circular level) such that the set is horizontal, with the cover glass facing the floor, i.e., in the direction of the impact area (see FIG. 6). The first drop height is 25 cm, then the drop is from a height of 30 cm. If breakage still does not occur, the drop height is increased in 10 cm steps until glass breakage occurs. The breakage height, the breakage origin and the breakage appearance are noted. The test is conducted on 10 to 15 samples, and an average is formed.

Figure 7A:
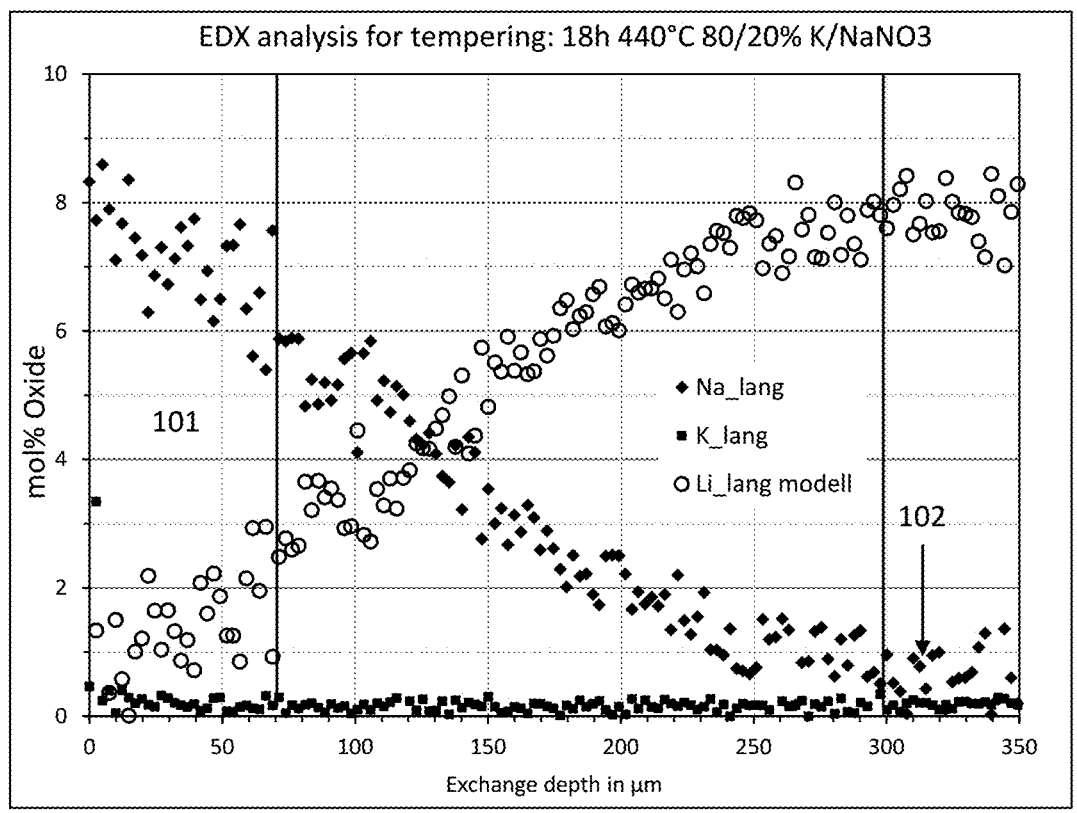
FIGS. 7A and 7B show the evaluation of EDX measurements on two different samples of a glass-ceramic cover glass.
Figure 7B:
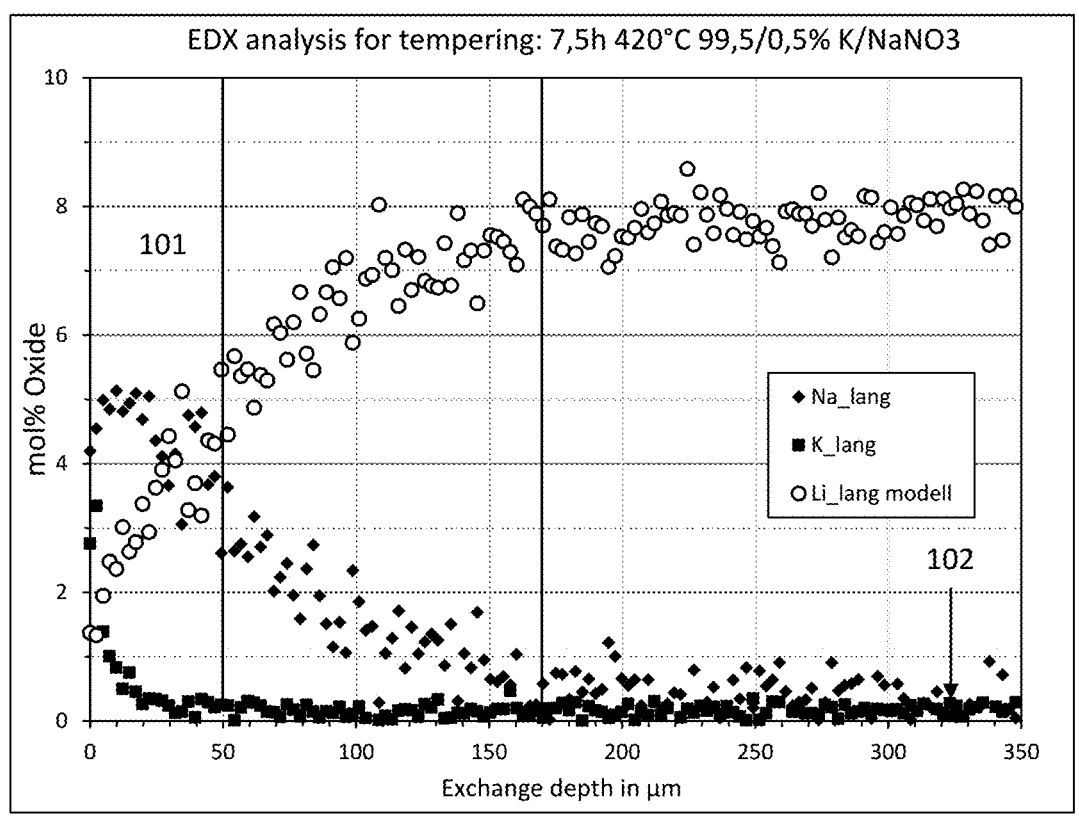

FIGS. 7A and 7B show the evaluation of EDX measurements on two different samples of a glass-ceramic cover glass. The glass-ceramic material of the cover glass was of identical composition, but was subjected to different tempering protocols.

In FIG. 7A, a silica based glass ceramic was chemically tempered in an exchange bath composed of 80% by weight of $KNO_3$ and 20% by weight of $NaNO_3$ at 440° C. for 18 hours. According to the EDX evaluation, it is apparent that the sodium oxide content at the sample surface is about 8 mol %. For the region of the core or of the bulk 102, a content of about 1 mol % of $Na_2O$ can be assumed. This is also identified as such in FIG. 7A at the top. By means of the tempering mentioned of the glass ceramic in the cover glass, at least in a near-surface region 101, it is possible to distinctly increase the $Na_2O$ content, in some cases by up to 7 mol % in absolute terms or—preferably averaged over the thickness of the near-surface region 101 from FIG. 2—by up to 6 mol % in absolute terms.

As already set out further up, it is more difficult with regard to the larger potassium ion to arrive at such an increase in the potassium oxide content. According to the exact configuration of the glass ceramic and/or the tempering protocol, exchange depths peaking at about 30 μm are achieved here; the inventors assume that greater exchange depths should also be possible with optimized processes and materials. Although potassium exchange is more difficult to accomplish, it is simultaneously also more efficient, such that CS 0 values of, for example, up to 1500 MPa, for example 1200 MPa or 1100 MPa, appear possible. In the case of other tempering protocols, as depicted by way of example in FIG. 7B, a very high potassium concentration was employed in the exchange bath. The composition of the exchange bath here was 99.5% by weight of $KNO_3$ and only 0.5% by weight of $NaNO_3$. The exchange bath temperature was 420° C.; the duration of tempering was 7.5 hours. Here, as can be inferred from FIG. 7B, there is an increase in the $Na_2O$ content in the near-surface region 101 of the cover glass, peaking at at least 5 mol %, even though only a very low $NaNO_3$ content is present in the exchange bath. However, the $K_2O$ content is also demonstrably increased and peaks at up to nearly 3 mol %. In the core 102, by contrast, there is a much lower content of $K_2O$ and $Na_2O$, since there has been no corresponding exchange here.

It is pointed out that there is a transition region between the region 101 and the core 102 in which exchange has taken place, and at least to some degree also an increase in the size of the unit cell volume. This "intermediate region" is a region in which ion exchange has still taken place, but an increase in compressive stress need not necessarily have taken place.

Figure 8:
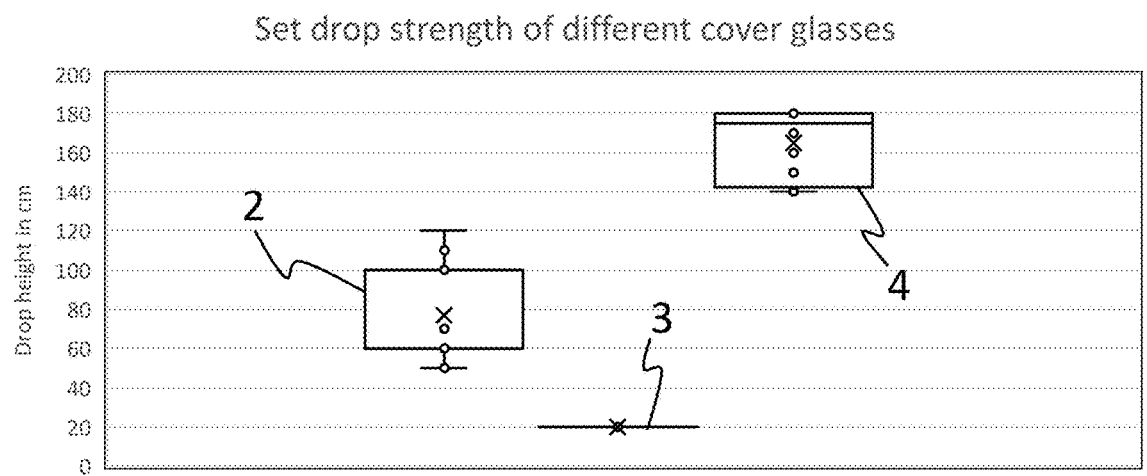
FIG. 8 shows a comparison of set drop resistance of different cover glasses.

FIG. 8, finally, shows a comparison of set drop resistance of different cover glasses having the same chemical composition, but different crystal phase content or different ceramization. In the stress curve, 102 denotes the core, the region of the stress minimum in the cover glass. 2 here denotes the results that are obtained at drop heights for a green glass that is in chemically tempered form. 3 denotes the results for a glass ceramic comprising a crystal phase—in this case high quartz solid solution—that is not amenable to tempering in the crystal phase. The strength achieved in the set drop test is entirely inadequate. Finally, 4 denotes the result for a cover glass according to an embodiment, here comprising keatite as crystal phase. The results of the set drop test are also compiled in the table below. The drop heights are each reported in cm.

| Samples 2 | Samples 3 | Samples 4 |
|---|---|---|
| 60 | 20 | 180 |
| 70 | 20 | 150 |
| 60 | 20 | 180 |
| 100 | 20 | 140 |
| 100 | 20 | 180 |

-continued

|  | Samples 2 | Samples 3 | Samples 4 |
|---|---|---|---|
|  | 60 | 20 | 180 |
|  | 120 | 20 | 140 |
|  | 110 | 20 | 170 |
|  | 100 | 20 | 180 |
|  | 50 | 20 | 140 |
|  | 50 | 20 | 180 |
|  | 60 | 20 | 160 |
|  | 60 |  |  |
| Mean | 77 | 20 | 165 |
| Median | 60 | 20 | 175 |
| Min | 50 | 20 | 140 |
| Max | 120 | 20 | 180 |

Figure 9:
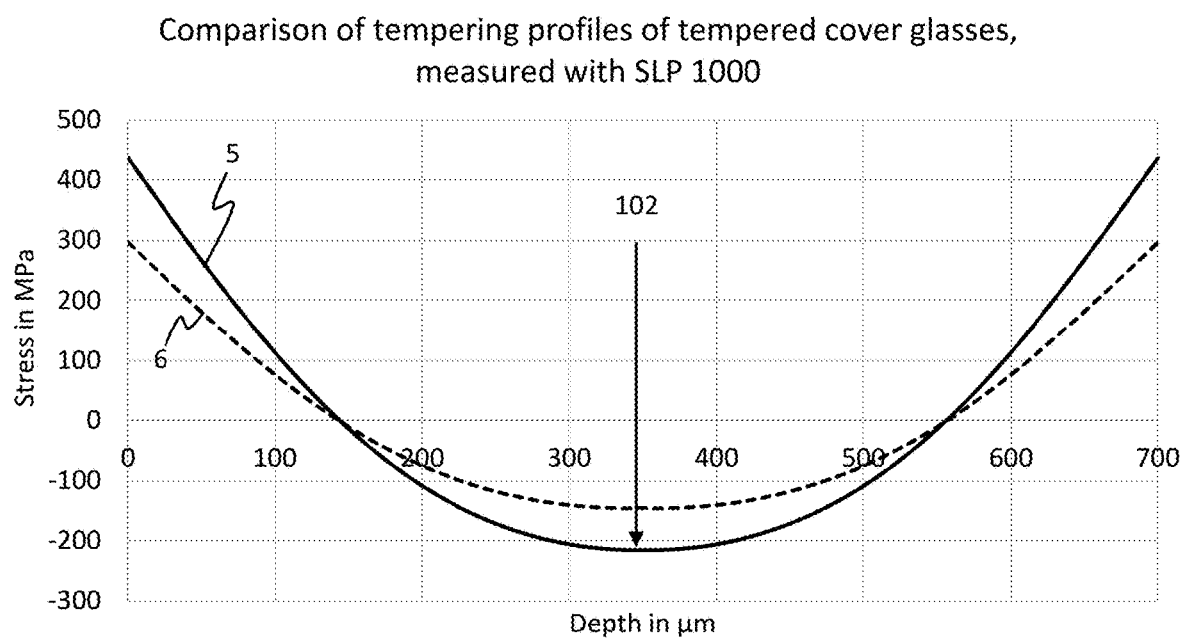
FIG. 9 compares illustrative tempering profiles of cover glasses with one another.

FIG. 9 compares illustrative tempering profiles of cover glasses with one another, namely a tempering profile of a cover glass according to one embodiment with a tempering profile for a cover glass comprising a material that is of the same chemical composition but unceramized. Tempering profile 5 corresponds to that of a cover glass according to one embodiment, tempering profile 6 to that of a cover glass comprising a material of the same chemical composition, but in vitreous and unceramized form. 102 denotes the core, the region in which stress assumes a minimum value.

LIST OF REFERENCE NUMERALS 1 cover glass
10, 12 sides of the cover glass
101 near-surface layer of the cover glass
102 core
d thickness of the cover glass
l length of the cover glass
b width of the cover glass
2, 3, 4 results of set drop tests for different sample entities
5 tempering profile according to embodiment
6 tempering profile of a comparative example

What is claimed is:

1. A cover glass comprising:
   a chemically tempered silica based glass ceramic having two faces;
   a thickness between the two faces of at least 0.4 mm and at most 0.85 mm;
   a transmittance of more than 80% in a range from 380 nm to 780 nm; and
   a stress attribute selected from a group consisting of: an overall compressive stress (CS) of at least 250 MPa and at most 1500 MPa, a compressive stress at a depth of 30 µm (CS30) from one of the two faces of at least 160 MPa and at most 525 MPa, a depth of the compression layer (DoCL) of at least 0.2 times the thickness and less than 0.5 times the thickness, and any combinations thereof,
   wherein the chemically tempered silica based glass ceramic comprises at least one silica based crystal phase having in a near-surface layer of 20 µm to 70 µm, determined at a right angle from one of the two faces, a unit cell volume of at least 1% by volume larger than that of a core where the crystal phase has minimum stresses.

2. The cover glass of claim 1, wherein the unit cell volume is at least 2% by volume larger.

3. The cover glass of claim 1, wherein the at least one silica based crystal phase in the near-surface layer has a higher proportion of sodium oxide $Na_2O$ and/or potassium oxide $K_2O$ than in the core.

4. The cover glass of claim 1, wherein the chemically tempered silica based glass ceramic comprises more than 50% by volume of crystal phase and not more than 95% by volume.

5. The cover glass of claim 1, further comprising a color value C* of less than 4.

6. The cover glass of claim 1, further comprising a color value C* of less than 3.

7. The cover glass of claim 1, further comprising a haze of 0.01% to 1%, based on a thickness of the cover glass of 0.7 mm.

8. The cover glass of claim 1, wherein the chemically tempered silica based glass ceramic is an lithium aluminum silicate glass ceramic and the crystal phase is a keatite solid solution.

9. The cover glass of claim 1, wherein the chemically tempered silica based glass ceramic comprises components in % by weight based on oxide:
   $SiO_2$ 55-75,
   $Al_2O_3$ 18-27, and
   $Li_2O$ 2.8-5.

10. The cover glass of claim 1, wherein the chemically tempered silica based glass ceramic comprises components in % by weight based on oxide:
    $SiO_2$ 62-72,
    $Al_2O_3$ 18-23, and
    $Li_2O$ 3-5.

11. The cover glass of claim 1, wherein the chemically tempered silica based glass ceramic comprises components in % by weight based on oxide:
    $SiO_2$ 55-75,
    $Al_2O_3$ 18-27,
    $Li_2O$ 2.8-5,
    $Na_2O$ 0-4,
    $K_2O$ 0-4,
    $MgO$ 0-8,
    $CaO$ 0-4,
    $SrO$ 0-4,
    $BaO$ 0-4,
    $ZnO$ 0-6,
    $TiO_2$ 0-4,
    $ZrO_2$ 0-5,
    $B_2O_3$ 0-2,
    $Fe_2O_3$ 0.0001-0.1, and
    $SnO_2$ 0-2,
    where the following condition is applicable to a sum total of the $TiO_2$ and $ZrO_2$ components: $0<\Sigma$ ($TiO_2+ZrO_2$) <9.5%.

12. The cover glass of claim 11, wherein the following condition is applicable to the sum total of the $TiO_2$ and $ZrO_2$ components: $1.2<\Sigma$ ($TiO_2+ZrO_2$)<9.5%.

13. The cover glass of claim 1, wherein the chemically tempered silica based glass ceramic comprises components in % by weight based on oxide:
    $SiO_2$ 62-72,
    $Li_2O$ 3-5,
    $Na_2O$ 0-2,
    $K_2O$ 0-2,
    $MgO$ 0-4,
    $CaO$ 0-2,
    $SrO$ 0-2,
    $BaO$ 0-2,
    $ZnO$ 0-2,
    $TiO_2$ 0-3,
    $ZrO_2$ 1.2-4,
    $B_2O_3$ 0-0.1,
    $Fe_2O_3$ 0.0001-0.02, and $SnO_2$ 0.05-1.6, where the following condition is applicable to a sum total of the $TiO_2$ and $ZrO_2$ components: $0<\Sigma\ (TiO_2+ZrO_2)<9.5\%$.

14. The cover glass of claim 13, wherein the following condition is applicable to a sum total of the $TiO_2$ and $ZrO_2$ components: $1.2<\Sigma\ (TiO_2+ZrO_2)<9.5\%$.

15. The cover glass of claim 1, wherein the chemically tempered silica based glass ceramic comprises $SnO_2$, $ZrO_2$, and $TiO_2$, and wherein $SnO_2$, $ZrO_2$, and $TiO_2$ satisfy the following condition $0 \leq SnO_2/(ZrO_2+TiO_2)<0.8$.

16. The cover glass of claim 1, wherein the chemically tempered silica based glass ceramic comprises $SnO_2$, $ZrO_2$, and $TiO_2$, and wherein $SnO_2$, $ZrO_2$, and $TiO_2$ satisfy the following condition $0.01 \leq SnO_2/(ZrO_2+TiO_2)<0.7$.

17. The cover glass of claim 1, further comprising a sharp impact strength determined in a set drop test that is between a drop height of at least 120 cm and up to 200 cm.

18. The cover glass of claim 1, wherein the cover glass is configured for a use selected from a group consisting of a cover glass of an electronic device, a cover glass of an electronic display, a cover glass of a mobile electronic display device, a cover glass of a mobile touch panel, a cover glass of a mobile digital display device, a cover glass of a smartphone, and a cover glass of a smartwatch.

* * * * *